Patented June 13, 1933

1,913,394

UNITED STATES PATENT OFFICE

EDWIN JOYCE, OF UPPER DARBY, PENNSYLVANIA

MATERIAL FOR WELDING WROUGHT ALUMINUM ALLOYS

No Drawing.   Application filed January 28, 1932.  Serial No. 589,542.

(GRANTED UNDER THE ACT OF MARCH 3, 1883, AS AMENDED APRIL 30, 1928; 370 O. G. 757)

This invention relates to the welding of wrought aluminum alloys, and has for its object to provide a material that will improve the physical properties of such welds.

The welding of metal parts is accomplished by the application of heat so that the parts to be welded are joined by fusion. The fused metal constitutes the weld and the physical properties of the welded assembly depend primarily upon the properties of the metal in the weld. The physical properties of the metal in the weld are in turn dependent upon the composition of the metal, its internal structure and treatment employed subsequent to welding.

In welding wrought aluminum alloys, it has been the practice either to use autogenous welding methods in which portions of the parts to be joined are fused in the location of the weld, or to supply additional metal to the weld by fusion of a welding rod. In both methods the metal in the weld has an internal structure characteristic of cast metal. In the first method the composition of the metal in the weld is that of the wrought alloy welded. In the second method, the composition of the weld depends upon the composition of the welding rod used. Hitherto it has been the practice to use welding rods having the same composition as the parts to be welded or to use one of different composition, but in no instances known has a strictly casting alloy composition been used. The welds made by using welding rods have therefore not hitherto had compositions characteristic of casting alloys of aluminum.

The classification of aluminum alloys into two groups; (1) wrought alloys, and (2) casting alloys, is dependent upon properties which in turn are dependent on the chemical compositions of the alloys. The wrought alloy compositions are not suitable for manufacture of castings of good quality because the properties of these alloys in the cast condition are inferior to those obtained from casting alloy compositions.

Instead of using any of the compositions hitherto employed, I use, as filling metal in the weld, an aluminum alloy having substantially the following composition:—

|  | Per cent |
| --- | --- |
| Aluminum | 92½ |
| Copper | 4 to 5 |
| Silicon | 1.20 |
| Zinc | 0.25 |
| Iron | 1.20 |
| Magnesium | 0.25 |
| Manganese | Trace |

This composition is very suitable for casting purposes and castings made from it have good physical properties which are improved by the heat treatments used in producing the high physical properties of the wrought aluminum alloys. However, the best results are obtained if the given percentage of aluminum be taken as the minimum proportion of that element and the percentages of silicon, zinc, iron, and magnesium be taken as the respective maxima thereof.

The use of such casting alloys results in the following improvements:—

1. Greater ease in welding and more sightly welds.
2. Greater uniformity of weld properties.
3. Higher physical properties of the welded parts. This applies to both the metal in the weld and to the metal adjacent the weld.
4. Parts welded by this method are susceptible to heat treatment.
5. Distortion and cracking of the weld during heat treatment are minimized.
6. Welds are non-porous.
7. Cold working properties of the weld are at a maximum.
8. Fatigue resistance of welds is greater than for other welding compositions.

It will be understood that the above description comprehends only the general and preferred embodiment of my invention, and that various changes therein may be made within the scope of the appended claims without sacrificing any of the advantages of my invention.

The invention described herein may be manufactured and used by or for the Government of the United States of America for governmental purposes without the payment of any royalties thereon.

I claim:

1. A welding material having substantially the following composition: aluminum, 92½%; copper, 4 to 5%; silicon, 1.20%; zinc, 0.25%; iron, 1.20%; magnesium, 0.25%; manganese, trace.

2. An aluminum alloy having substantially the following composition: copper 4% to 5%; silicon 1.20%; zinc 0.25%; iron 1.2%; magnesium 0.25% and the remainder practically all aluminum.

EDWIN JOYCE.